US008380131B2

(12) United States Patent
Chiang

(10) Patent No.: US 8,380,131 B2
(45) Date of Patent: Feb. 19, 2013

(54) FREQUENCY SELECTION SYSTEM INCLUDING A WIRELESS MICROPHONE AND A RECEIVER

(76) Inventor: Albert Chiang, Taipei (TW)

( * ) Notice: Subject to any disclaimer, the term of this patent is extended or adjusted under 35 U.S.C. 154(b) by 192 days.

(21) Appl. No.: 12/805,232

(22) Filed: Jul. 20, 2010

(65) Prior Publication Data

US 2012/0021686 A1    Jan. 26, 2012

(51) Int. Cl.
*H04B 7/00* (2006.01)
(52) U.S. Cl. ......... 455/41.3; 455/41.2; 455/62; 381/311
(58) Field of Classification Search ........ 455/41.1–41.3, 455/62, 63.3, 88, 550.1, 569.1; 381/311
See application file for complete search history.

(56) References Cited

U.S. PATENT DOCUMENTS

| 7,027,775 B2* | 4/2006 | Kamimura | 455/71 |
| 2010/0048131 A1* | 2/2010 | Hirsch et al. | 455/41.3 |

* cited by examiner

*Primary Examiner* — Tuan H Nguyen
(74) *Attorney, Agent, or Firm* — Jacobson Holman PLLC

(57) ABSTRACT

A frequency selection system includes a wireless microphone and a receiver. The wireless microphone includes a microphone element for receiving sound and outputting a corresponding audio signal, and a transceiver device electrically coupled to the microphone element for wireless transmission of the audio signal and configuration communication. The transceiver device has a first communication unit operable to receive a frequency code. The transceiver device also includes a wireless transmission unit operable to wirelessly transmit the audio signal received from the microphone element using a wireless transmission frequency that corresponds to the frequency code received by the first communication unit. The receiver includes a second communication unit for wirelessly receiving a command code from the first communication unit and wirelessly sending the frequency code to the first communication unit.

11 Claims, 2 Drawing Sheets

FREQUENCY SELECTION SYSTEM INCLUDING A WIRELESS MICROPHONE AND A RECEIVER

BACKGROUND OF THE INVENTION

1. Field of the Invention

The invention relates to a frequency selection system, and more particularly to a frequency selection system including a wireless microphone and a receiver.

2. Description of the Related Art

A conventional frequency selection system may permit a user to manually select a frequency of a wireless microphone followed by manual selection of the same frequency for a receiving device. Interference above a threshold limit in one or more attempted frequencies may require multiple attempts to manually determine an acceptable frequency for transmission and reception of audio signals. Operation of the conventional frequency selection system may therefore be tedious, time consuming, and inconvenient.

SUMMARY OF THE INVENTION

Therefore, an object of the present invention is to provide a frequency selection system including a wireless microphone and a receiver, and that facilitates automatic frequency matching.

Accordingly, the wireless microphone of this invention includes a microphone element for receiving sound and outputting a corresponding audio signal, and a transceiver device electrically coupled to the microphone element for wireless transmission of the audio signal and configuration communication.

The transceiver device has a first communication unit operable to receive a frequency code. The transceiver device also includes a wireless transmission unit operable to wirelessly transmit the audio signal received from the microphone element using a wireless transmission frequency that corresponds to the frequency code received by the first communication unit. The transceiver device further includes a first microprocessor operable to wirelessly send a command code through the first communication unit, to receive the frequency code through the first communication unit, and to drive the wireless transmission unit such that the wireless transmission frequency used thereby to transmit the audio signal corresponds to the frequency code received from the first communication unit. The transceiver device also includes a first operable part that is operable to drive the first microprocessor to send the command code and to receive the frequency code.

The receiver includes a second communication unit for wirelessly receiving the command code from the first communication unit and wirelessly sending the frequency code to the first communication unit. The receiver also includes a receiving unit for wirelessly receiving the audio signal transmitted from the wireless transmission unit using the wireless transmission frequency corresponding to the frequency code. The receiver further includes a frequency selection unit for selecting the wireless transmission frequency. The frequency selection unit is drivable to control the wireless receiving unit to use the selected wireless transmission frequency to receive the audio signal.

The receiver also includes a second microprocessor for driving the frequency selection unit to select the wireless transmission frequency in response to receipt of the command code received by the second communication unit from the first communication unit, for generating the frequency code in such a manner that the frequency code corresponds to the selected wireless transmission frequency, and for sending the frequency code to the first communication unit through the second communication unit.

An advantage of the preferred embodiment of the present invention includes using the frequency selection unit to seek and lock on a selected frequency, transmitting the selected wireless transmission frequency information to the wireless microphone, and tuning the wireless microphone to the selected wireless transmission frequency. Accordingly, the frequency selection system of the preferred embodiment of the present invention is more convenient.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
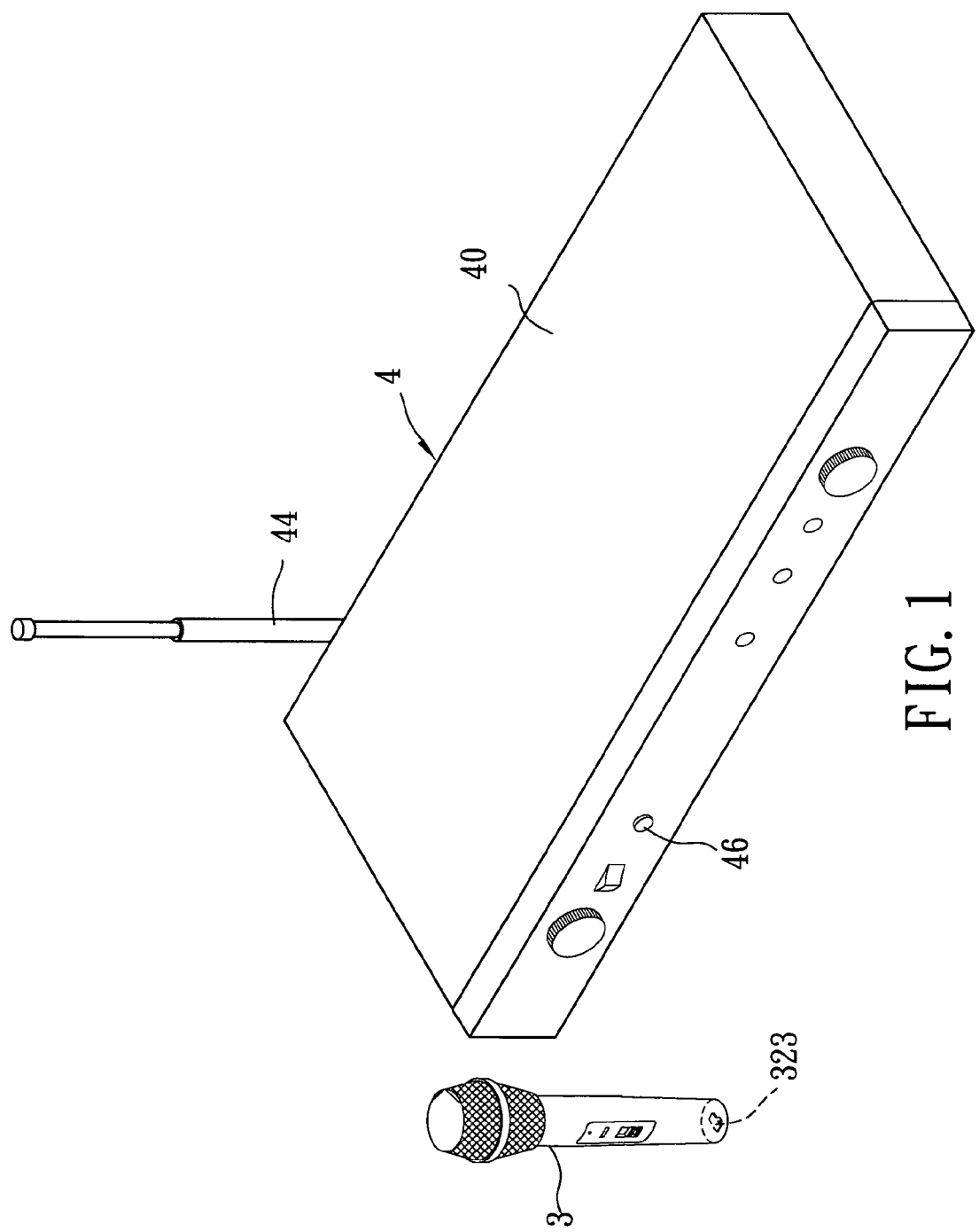
FIG. 1 is a perspective view of a frequency selection system according to the preferred embodiment of the present invention.
Figure 2:
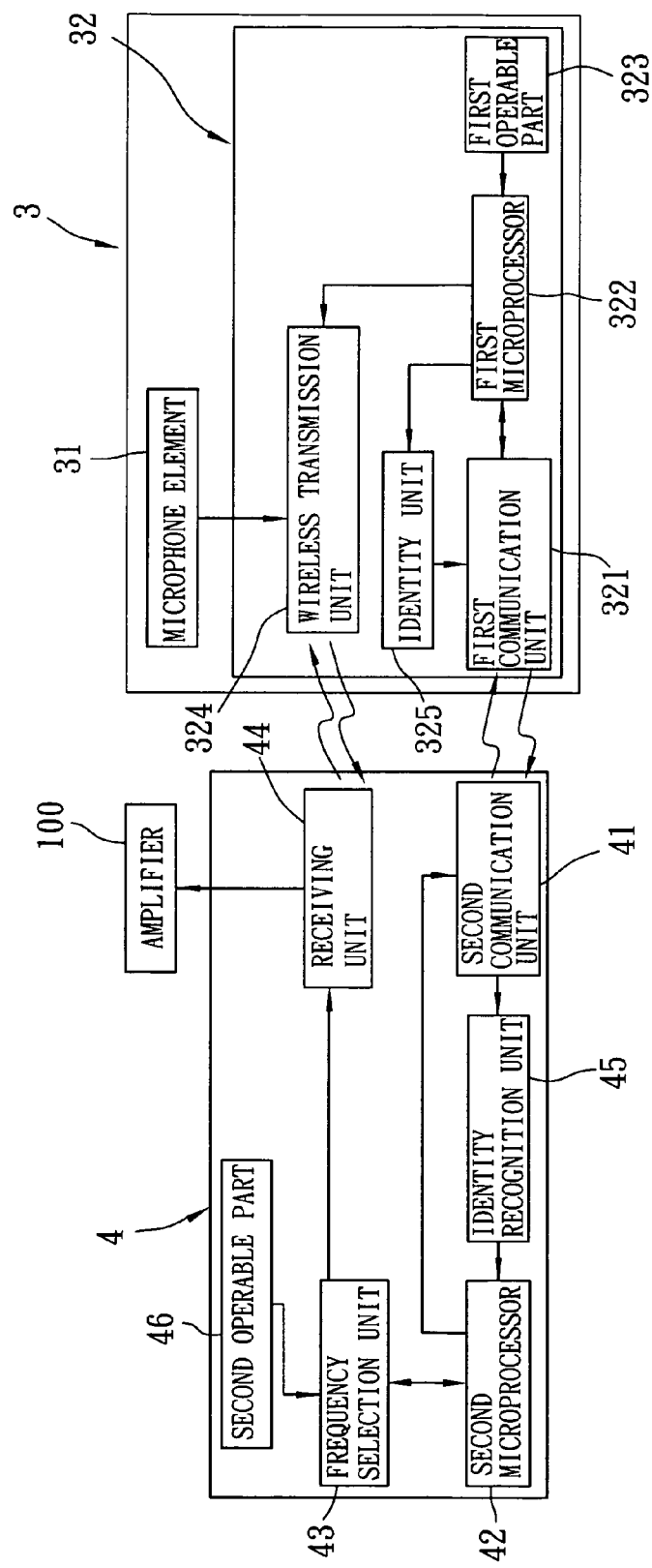
FIG. 2 is a schematic block diagram of the preferred embodiment.

Referring to FIGS. 1 and 2, the preferred embodiment of a frequency selection system according to the present invention is shown to include a wireless microphone 3 and a receiver 4 that is capable of two-way wireless communication with the wireless microphone 3.

The wireless microphone 3 includes a microphone element 31 configured for receiving sound and outputting a corresponding audio signal. The wireless microphone 3 further includes a transceiver device 32 electrically coupled to the microphone element 31 for wirelessly transmitting the audio signal and configuration communication. The transceiver device 32 may be mounted to the wireless microphone 3. The microphone element 31 may include a pick-up unit. The system for receiving sound and outputting an audio signal is not further detailed hereinafter.

The transceiver device 32 includes a first communication unit 321 operable to receive a frequency code, and a first microprocessor 322 coupled electrically to the first communication unit 321. The transceiver device 32 further includes a first operable part 323 coupled electrically to the first microprocessor 322, a wireless transmission unit 324 coupled electrically to the first microprocessor 322, and an identity unit 325 coupled electrically between the first communication unit 321 and the first microprocessor 322. The first operable part 323 may include a first button, a rocker, a toggle, a touch pad, a lever, or a part that is otherwise capable of receiving user input.

The first microprocessor 322 is operable to wirelessly send a command code through the first communication unit 321, to receive the frequency code through the first communication unit 321, and to drive the wireless transmission unit 324 such that a wireless transmission frequency used thereby to transmit the audio signal corresponds to the frequency code received from the first communication unit 321.

The first communication unit 321 includes a built-in wireless communication system drivable by the first microprocessor 322 and capable of two-way wireless communication with the receiver 4. In this embodiment, the wireless communication frequency of the first communication unit 321 is 2.4 GHz (2400~2438.5 MHz ISM/SRB band).

The first operable part 323 is mounted to the wireless microphone 3 and is operable to drive the first microprocessor 322 to cause the first communication unit 321 to send a command code requesting a wireless transmission frequency. The first communication unit 321 is also operable to receive a frequency code from the receiver 4. The frequency code includes information related to a wireless transmission frequency. The first microprocessor 322 may then drive the wireless transmission unit 324 to transmit the audio signal using a wireless transmission frequency that corresponds to the frequency code received from the first communication unit 321.

The identity unit 325 includes an identity code, and may be driven by the first microprocessor 322 to transmit the identity code through the first communication unit 321.

The receiver 4 includes a second communication unit 41 for conducting two-way wireless communication with the first communication unit 321, and a second microprocessor 42 coupled electrically to the second communication unit 41. The receiver 4 further includes a frequency selection unit 43 coupled electrically to the second microprocessor 42, and a wireless receiving unit 44 coupled electrically to the frequency selection unit 43 and operable to wirelessly receive the audio signal using a wireless transmission frequency that corresponds to the frequency code.

The receiver 4 further includes an identity recognition unit 45 coupled electrically between the second communication unit 41 and the second microprocessor 42, and a second operable part 46 coupled electrically to the frequency selection unit 43. The second operable part 46 may include a second button, a rocker, a toggle, a touch pad, a lever, or a part that is otherwise capable of receiving user input.

The receiver 4 may further include a housing 40 that contains the second communication unit 41, the receiving unit 44, the frequency selection unit 43, the second microprocessor 42, and the identity recognition unit 45. The second operable part 46 may be mounted to the housing 40 and is operable to drive the frequency selection unit 43 to determine a selected wireless transmission frequency.

The second communication unit 41 is operable to wirelessly receive the identification code and the command code from the first communication unit 321. The second communication unit 41 is further operable to send the frequency code to the first communication unit 321. In this embodiment, the communication frequency between the first communication unit 321 and the second communication unit 41 is approximately 2.4 GHz (e.g., 2400~2483.5 MHz ISM/SRD band).

The identity recognition unit 45 includes identification code data that permits recognition of the identification code received by the second communication unit 41. After recognition of the identification code, the identity recognition unit 45 permits the command code received by the second communication unit 41 from the first communication unit 321 to be communicated to the second microprocessor 42.

The frequency selection unit 43 maybe operated with respect to multiple wireless communication frequencies. In response to the command code received from the identity recognition unit 45 or the second communication unit 41, the second microprocessor 42 is operable to drive the frequency selection unit 43 to seek, test, and lock on a selected wireless transmission frequency for receiving wireless signals from the wireless microphone 3. The second microprocessor 42 is operable to then drive the second communication unit 41 to transmit the frequency code of the selected wireless transmission frequency to the first communication unit 321. In addition, the frequency selection unit 43 is drivable to control the wireless receiving unit 44 such that it receives audio signal data from the wireless transmission unit 324 using the selected wireless transmission frequency. The second operable part 46 may be activated to drive the frequency selection unit 43 to change the frequency of the wireless receiving unit 44 for receiving sound signals.

When the wireless microphone 3 is to be used, the first operable part 323 may be depressed to activate the first microprocessor 322. The first microprocessor 322 then drives the identity unit 325 to provide the identification code to the first communication unit 321, which is driven by the first microprocessor 322 to wirelessly transmit the identification code and the command code.

The second communication unit 41 wirelessly receives the identification code and the command code. The identity recognition unit 45 identifies whether the identification code received by the second communication unit 41 is consistent with its internally stored identification codes. If the received identification code is consistent with the stored identification codes, the command code received by the second communication unit 41 is sent to the second microprocessor 42. If the received identification code is not determined to be consistent, the command code is not sent to the second microprocessor 42, and the receiver 4 takes no further action.

After receiving the command code, the second microprocessor 42 drives the frequency selection unit 43 to seek and lock on a selected wireless transmission frequency with interference below a threshold level. For example, the selected wireless transmission frequency may not currently be used for transmission by another electronic device near the receiver 4. Alternatively, the selected wireless transmission frequency may have sufficiently low interference to be used for reception of signals by the receiver 4 from the wireless transmission unit 324 of the wireless microphone 3. The selected wireless transmission frequency may have the least interference of a set of searched frequencies.

The second microprocessor 42 is operable to generate the frequency code in such a manner that the frequency code corresponds to the selected wireless transmission frequency. The second microprocessor 42 drives the second communication unit 41 to transmit the frequency code that corresponds to the selected wireless transmission frequency to the first communication unit 321. The frequency selection unit 43 also drives the wireless receiving unit 44 to switch to the selected wireless transmission frequency for receiving audio signals, thus permitting the wireless transmission unit 324 and the wireless receiving unit 44 to operate on matching frequencies. Accordingly, the wireless transmission unit 324 is operable to send the audio signal output by the microphone element 31 to the wireless receiving unit 44 using the selected wireless transmission frequency for subsequent amplification by an amplifier 100.

Moreover, a user may also depress the second operable part 46 to cause the frequency selection unit 43 to seek and lock on a pretuned selected wireless transmission frequency with interference below a threshold level. After the second microprocessor 42 receives the command code, the pretuned selected wireless transmission frequency information is sent to the first communication unit 321 of the wireless microphone 3 via the second communication unit 41. The pretuned selected frequency information may be transferred using a corresponding frequency code. In practice, the second operable part 46 may not be required.

In variations of the preferred embodiment, a frequency code corresponding to the pretuned selected frequency information may be transmitted to the first communication unit 321 before the command code. The first microprocessor 322 of the wireless microphone 3 may then generate a command code to be transmitted to the second communication unit 41 via the first communication unit 321 to confirm that the pre-tuned selected frequency information was received, and should be adopted for transmission and receipt of the audio signal.

In summary, in the preferred embodiment of the present invention, two-way wireless communication between the wireless microphone 3 and the receiver 4 may be accomplished by operating the first operable part 323, which causes the first communication unit 321 of the wireless microphone 3 to transmit a command code to the second communication unit 41 of the receiver 4. After the command code is received, the receiver 4 seeks and locks on a selected wireless transmission frequency and transmits a corresponding frequency code to the wireless microphone 3. The wireless microphone 3 uses the frequency code to determine that the selected wireless transmission frequency should be used to transmit audio signals to the receiver 4. Matching the communication frequency between the wireless microphone 3 and the receiver 4 is thus made easier.

In addition, use of the identity unit 325 and the identity recognition unit 45 to transmit and receive the identification data prevents other devices from interfering with the frequency matching process between the wireless microphone 3 and the receiver 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A frequency selection system comprising:
    a wireless microphone including
        a microphone element for receiving sound and outputting a corresponding audio signal, and
        a transceiver device electrically coupled to said microphone element for wireless transmission of the audio signal and configuration communication, said transceiver device having
            a first communication unit operable to receive a frequency code,
            a wireless transmission unit operable to wirelessly transmit the audio signal received from said microphone element using a wireless transmission frequency that corresponds to the frequency code received by said first communication unit,
            a first microprocessor operable to wirelessly send a command code through said first communication unit, to receive the frequency code through said first communication unit, and to drive said wireless transmission unit such that the wireless transmission frequency used thereby to transmit the audio signal corresponds to the frequency code received from said first communication unit, and
            a first operable part that is operable to drive said first microprocessor to send the command code and to receive the frequency code; and
    a receiver that includes
        a second communication unit for wirelessly receiving the command code from said first communication unit and wirelessly sending the frequency code to said first communication unit,
        a receiving unit for wirelessly receiving the audio signal transmitted from said wireless transmission unit using the wireless transmission frequency corresponding to the frequency code,
        a frequency selection unit for selecting the wireless transmission frequency, said frequency selection unit being drivable to control said wireless receiving unit to use the selected wireless transmission frequency to receive the audio signal, and
        a second microprocessor for driving said frequency selection unit to select the wireless transmission frequency in response to receipt of the command code received by said second communication unit from said first communication unit, for generating the frequency code in such a manner that the frequency code corresponds to the selected wireless transmission frequency, and for sending the frequency code to said first communication unit through said second communication unit.

2. The frequency selection system as claimed in claim 1, wherein said transceiver device and said first operable part are mounted to said wireless microphone.

3. The frequency selection system as claimed in claim 1, wherein said first operable part includes a first button.

4. The frequency selection system as claimed in claim 1, wherein the communication frequency between said first communication unit and said second communication unit is substantially 2.4 GHz.

5. The frequency selection system as claimed in claim 1, wherein said transceiver device further includes an identity unit that provides an identification code that is transmitted from said first communication unit to said second communication unit,
    said receiver further including an identity recognition unit for recognizing the identification code received by said second communication unit and for driving said second communication unit to send the frequency code after said identity code has been recognized.

6. The frequency selection system as claimed in claim 5, wherein said first microprocessor is electrically coupled to said first communication unit, said wireless transmission unit, said first operable part, and said identity unit, said identity unit being electrically coupled between said first communication unit and said first microprocessor.

7. The frequency selection system as claimed in claim 5, wherein said receiver further includes a housing that contains said second communication unit, said receiving unit, said frequency selection unit, said second microprocessor, said identity recognition unit, and a second operable part mounted to said housing and operable to drive said frequency selection unit to determine a selected wireless transmission frequency.

8. The frequency selection system as claimed in claim 7, wherein said second operable part includes a second button.

9. The frequency selection system as claimed in claim 7, wherein said second microprocessor is coupled electrically to said second communication unit, said frequency selection unit, and said identity recognition unit, said identity recognition unit being coupled electrically between said second microprocessor and said second communication unit, said second operable part being electrically coupled to said frequency selection unit.

10. The frequency selection system as claimed in claim 1, wherein said selected wireless transmission frequency determined by said frequency selection unit is a frequency with interference below a threshold level.

11. The frequency selection system as claimed in claim 1, wherein said selected wireless transmission frequency determined by said frequency selection unit has the least interference of a set of searched frequencies.

* * * * *